US005570761A

United States Patent [19]

Paton

[11] Patent Number: 5,570,761
[45] Date of Patent: Nov. 5, 1996

[54] VELOCITY RESPONSIVE FLUID ACTUATED FRICTION DAMPER

[76] Inventor: H. Neil Paton, 1460 Elliott Ave. West, Seattle, Wash. 98119-3124

[21] Appl. No.: 415,156

[22] Filed: Mar. 31, 1995

Related U.S. Application Data

[63] Continuation of Ser. No. 238,874, May 6, 1994, abandoned, which is a continuation-in-part of Ser. No. 87,067, Jul. 7, 1993, abandoned, which is a continuation-in-part of Ser. No. 25,674, Mar. 3, 1993, abandoned.

[51] Int. Cl.$^6$ .................................................. F16F 11/00
[52] U.S. Cl. .................................... 18/271; 188/322.18
[58] Field of Search ................................ 188/129, 271, 188/366, 367, 381, 301, 264 R, 264 B, 315, 318, 320, 282, 322.17, 322.18, 322.21, 322.22; 267/196–198, 134, 200, 201

[56] References Cited

U.S. PATENT DOCUMENTS 4,979,595  12/1990  Paton .......................................... 188/129

*Primary Examiner*—Josie Ballato
*Attorney, Agent, or Firm*—Jim Zegeer, Esq,

[57] ABSTRACT

A fluid actuated friction damper having telescopically movable inner and outer bodies, the outer body having an elongated, continuous friction surface. The inner body includes a first set of friction shoes engageable with the continuous friction surface, a fluid pressure responsive device for exerting a normal force to urge the friction shoes against the continuous friction surface, and a shuttle device supporting the friction shoes for limited axial movement between end stops on the inner body. The inner body also provides fluid pressure communication between an external source of pressurized fluid and the fluid pressure responsive device when the shuttle is at one of the stops and for isolating the fluid pressure responsive device from the external source when the shuttle is moved from the one stop. A second set of friction shoes and a second fluid pressure responsive device for exerting a normal force to urge the second shoes against the continuous friction surface independently of the first set of friction shoes. The pressure responsive devices for both friction shoe sets are controlled by regulating the pressure of fluid supplied to the inner body from the external fluid pressure source. The normal force for both sets of friction shoes may be developed by a single externally controlled fluid pressure or, alternatively, by separate externally controlled fluid pressures.

6 Claims, 5 Drawing Sheets

VELOCITY RESPONSIVE FLUID ACTUATED FRICTION DAMPER

CROSS REFERENCE TO RELATED APPLICATION

This application is a continuation of application Ser. No. 08/238,874 filed May 6, 1994, abandoned, which is a continuation-in-part of application Ser. No. 08/087,067 filed Jul. 7, 1993, abandoned, which is a continuation-in-part of application Ser. No. 08/025,674 filed Mar. 3, 1993, abandoned.

BACKGROUND OF THE INVENTION

This invention relates to shock absorbers, and, more particularly to velocity responsive fluid actuated friction dampers. The friction dampers of the present invention are useful for a wide range of friction damping applications but are intended principally for use in land vehicle suspension systems.

In U.S. Pat. No. 4,979,595, issued to the present inventor on Dec. 25, 1990, embodiments of a fluid actuated friction damper are disclosed in which relative movement between inner and outer telescopic bodies is damped by friction shoes on the inner body expanded by fluid pressure into engagement with a continuous internal surface on the outer body. In certain of the disclosed friction damper embodiments, an external dual pressure source is used to expand a single set of friction shoes under one pressure during one direction of relative inner and outer body movement and under a different pressure in the other direction of such relative movement. In other embodiments disclosed, a single external pressure source is applied alternately to axially spaced sets of friction shoes of differing effective area. Thus, in one direction of relative inner and outer body movement, the single fluid pressure is applied to one of the two sets of friction shoes whereas in the other direction of such relative movement, the same pressure is applied to the other of the two sets of shoes.

From the different embodiments disclosed in the prior patent, it is apparent that in one case, the friction force is changed upon directional reversal of body movement, while in the other case, the effective friction area is changed on directional reversal. In both cases, the relative direction of inner and outer body movement must be sensed, a controller is required to respond to the sensed direction of relative movement, and either the pressure of the fluid is required to be changed, as in the case of a dual pressure source, or the fluid flow path between the external source of fluid pressure is required to be changed, with each sensed direction of body movement reversal.

While the operational principles of the friction damper embodiments disclosed in the aforementioned patent are sound, the external pressurized fluid system is relatively complicated, and as such, costly from the standpoints of manufacture, installation and maintenance. As a result, the benefits of the controlled fluid pressure actuated friction damper represented by the embodiments disclosed in the prior patent have not been realized in a commercially competitive shock absorber market.

SUMMARY OF THE INVENTION

In accordance with the present invention, the problems associated with the relatively complex control systems required for the friction dampers of the type disclosed in the aforementioned patent are substantially avoided by a pressurized fluid actuated friction damper in which an external source of air or other gas, preferably at atmospheric pressure, is maintained in communication with one or more internal pressure chambers ported selectively to a friction shoe member through an internal pressure varying device responsive to velocity of relative movement between telescopic inner and outer bodies of the friction damper.

Additional features and advantages of the invention will be set forth in part in the description which follows, and in part will be obvious from the description, or may be learned by practice of the invention. The advantages of the invention will be attained by means of the elements and combinations particularly pointed out in the appended claims.

In accordance with the purpose of the invention, as embodied and broadly described herein, the velocity responsive fluid actuated friction damper of the invention comprises telescopic inner and outer bodies having overlapping inboard ends and oppositely extending outboard ends establishing a damper length which shortens in jounce movement between the inner and outer bodies and lengthens in rebound movement between the bodies. The outer body has an elongated, continuous friction surface between the inboard and outboard ends thereof whereas the inner body includes a hollow rod extending substantially between the inboard and outboard ends thereof and defining an interior cylindrical chamber surface. Friction shoe means are mounted on the hollow rod of the inner body near the inboard end thereof and are engageable with the continuous friction surface of the outer body under a normal friction force developed by compressed gas. A piston, positioned in and defining a restricted orifice closure with the cylindrical chamber surface, is fixed to the outer body and slidable relative to the cylindrical chamber surface. A seal defines with the cylindrical chamber surface and the piston a variable volume chamber, whereby movement of the piston during jounce movement of the inner and outer bodies reduces gas pressure in the variable volume chamber, and movement of the piston during rebound movement of the bodies increases gas pressure in the variable volume chamber. Means, responsive to gas pressure in said variable volume chamber, is provided for changing the normal force of engagement between said friction shoe means and said continuous friction surface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DETAILED DESCRIPTION OF THE PREFERRED EMBODIMENTS

Figure 1:
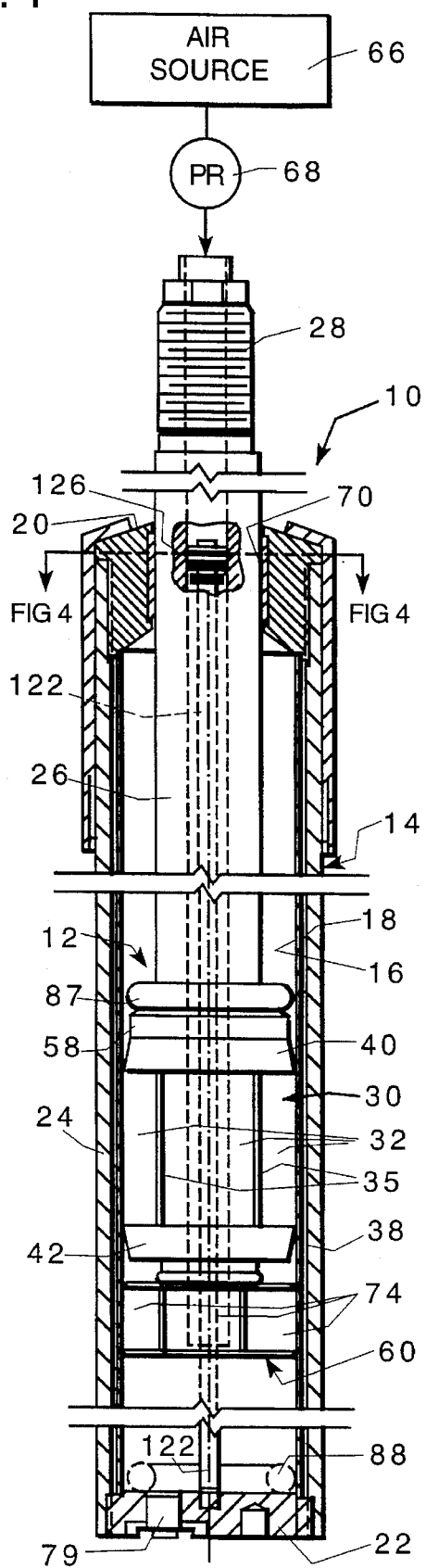
FIG. 1 is a fragmented partial longitudinal cross-section depicting an embodiment of the present invention.

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, a fluid actuated friction damper is provided with telescopic inner and outer bodies having overlapping inboard ends and oppositely extending outboard ends to establish a damper length. In practice, the respective inner and outer bodies are connected to relatively movable members between which movement is to be inhibited or damped. In automotive vehicle suspension systems, such relative movement is termed "jounce" when the relatively movable members move toward one another to shorten the damper length and "rebound" when the members move away from each other to increase the damper length. These terms are used herein and in the appended claims irrespective of the specific application for which the invention is used.

At least one friction shoe is supported for limited axial movement on the inner body by a shuttle device associated with valving ports for opening and closing fluid communication between a pressure source and an internal pressure chamber by which the at least one friction shoe is forced into engagement with a continuous inwardly facing friction surface on the outer body. Movement of the shuttle on the inner body is responsive to the relative direction of inner and outer body movement. Preferably, shuttle movement opens communication between the pressure source and the appropriate internal pressure chamber in response to rebound and closes off such communication in response to jounce.

In FIGS. 1–8, an exemplary embodiment of a fluid actuated friction damper incorporating the present invention is generally designated by the reference numeral 10 and shown to include an inner body 12 and an outer body 14 having a cylindrical inwardly facing friction surface 16. The surface 16 is formed on the interior of a thin walled cylindrical tube 18 supported at one end by an annular collar 20 and at the opposite end by an end wall 22. The collar 20 and end wall 22 are secured structurally by an outer body cylindrical wall 24. As illustrated, the inner wall 18 is spaced slightly from the outer wall 24 both to insulate the inner wall 18, particularly the inner surface 16 thereof, from physical deformation by external forces exerted on the outer wall 24 and also to provide an air passage for heat dissipation and cooling. In applications where the outer wall 24 is not subject to deformation by external forces, such as laterally induced tube collapsing forces or thermal distortion caused by welding, for example, the inner wall 18 may be eliminated and the surface 16 may be provided directly on the inside of the outer wall 24.

The inner body 12 includes an elongated hollow rod 26 extending through the collar 20 to an exterior threaded end 28 and supporting a friction shoe assembly 30 at its opposite or inner end. The threaded end 28 of the rod 26, in use, is fitted to one of the two members (not shown) between which movement is to be damped. The outer body 14 is connected to the other of such two members by an appropriate fitting (also not shown).

Figure 2:
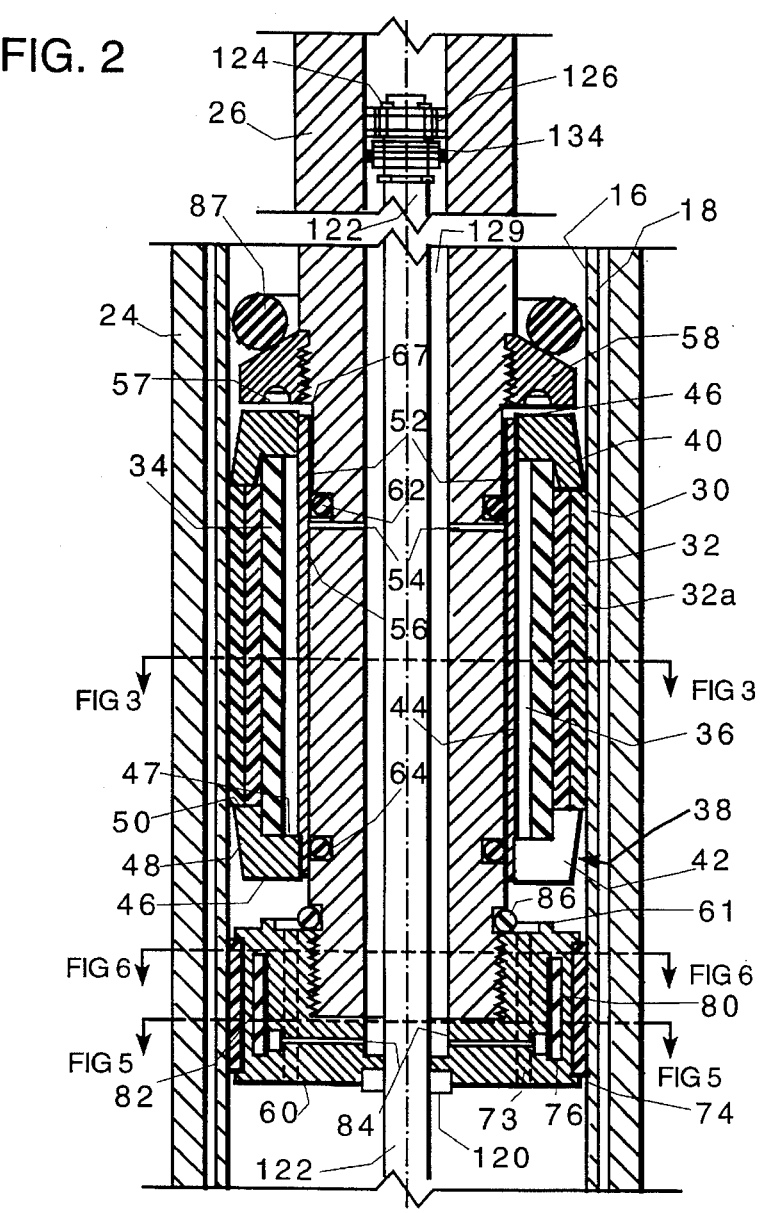
FIG. 2 is enlarged longitudinal cross-section of the central and upper portions of the embodiment illustrated in FIG. 1.
Figure 3:
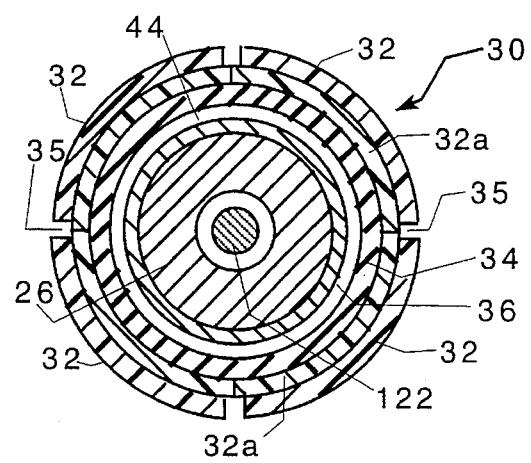
FIG. 3 is a cross-section on line 3—3 of FIG. 2.

The friction shoe assembly 30 in the illustrated embodiment, as shown most clearly in FIGS. 1–3, includes four arcuately convex friction shoes 32 positioned radially outside of an expansible elastomeric tube 34 by arcuate shims 32a to which the respective shoes are connected or with which the respective shoes are integrally formed. Each of the shims 32a has an arcuate width greater than the corresponding dimension of each shoe 32. As a result, the shoes are always spaced from each other by gaps 35 and the inwardmost position of the shoes is determined by edge-to-edge engagement of the shims 32a. The interior of the tube 34 defines part of an internal pressure chamber 36 by which the friction shoes 32 are forced outwardly into engagement with the friction surface 16 of the outer body 14.

As shown in FIG. 2, in the illustrated friction damper embodiment 10, the shuttle device is designated generally by the reference numeral 38 and includes end rings 40 and 42 integrally formed with or secured, such as by press fit, for example, to opposite ends of a cylindrical sleeve 44 dimensioned to be freely slidable on the outside of the hollow rod 26. Each of the end rings 40 and 42 is of a dish-shaped configuration to establish an exterior end abutment surface 46, an annular tube support surface 47, and an outwardly flared axial wall 48 terminating in a radial surface 50. The axial walls 48 of the end rings 40 and 42 extend toward each other to confine the ends of the elastomeric tube 34. The mutually facing annular support surfaces 47 on the end rings 40 and 42 are spaced to provide a compressive bias at the ends of the tubular wall 34 to cause the tube to bulge outward with no application of fluid presence on the inside thereof. Also, the radial surfaces 50 of the end rings, being of fixed axial spacing by connection to the ends of the sleeve 44, serve to fix the axial position of the friction shoes 32 in the shuttle 38.

The provision of a normal bias of the friction shoes 32 into frictional engagement with the friction surface 16, independent of fluid pressure in the chamber 36, is important to operation of the shuttle to be described in more detail below. As indicated above, the natural bias may be effected by an outward bulging of the elastomeric tube 34 and the inclusion of shims 32a between the exterior of the tube 34 and the friction shoes 32.

Figure 9:
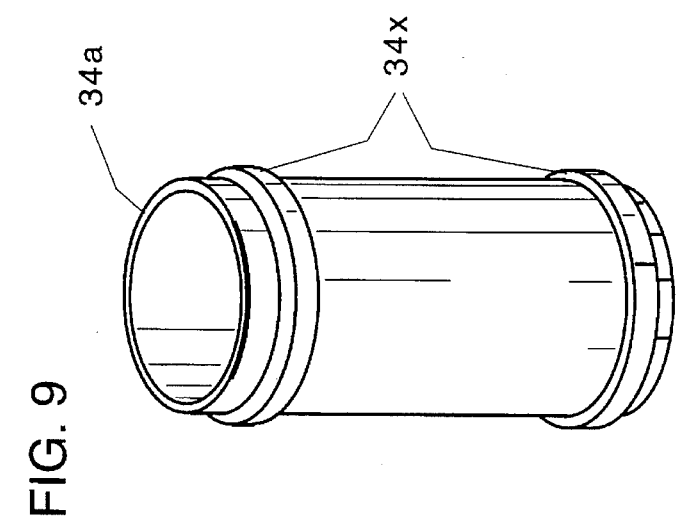
FIG. 9 is a perspective view of a modified pressure transmitting elastomeric tube usable in the embodiment of FIG. 1.

As shown in FIG. 9, a modified elastomeric tube 34a, which may be substituted for the tube 34 in the embodiment of FIGS. 2 and 3, includes a pair of spaced circumferential projecting ribs 34x. The ribs 34x, coupled with the elastomeric composition of the tube 34, ensure a normal outward bias force against the shims 32a, or directly against the shoes 32 without use of the shims 32a.

Figure 11:
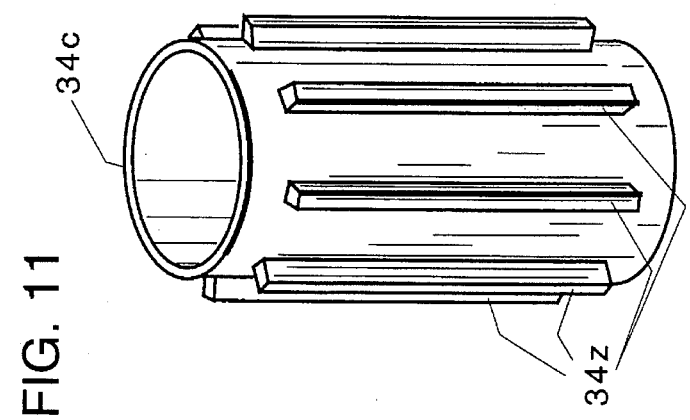
FIG. 11 is a perspective view of another variation of the tubes shown in FIGS. 9 and 10.
Figure 10:
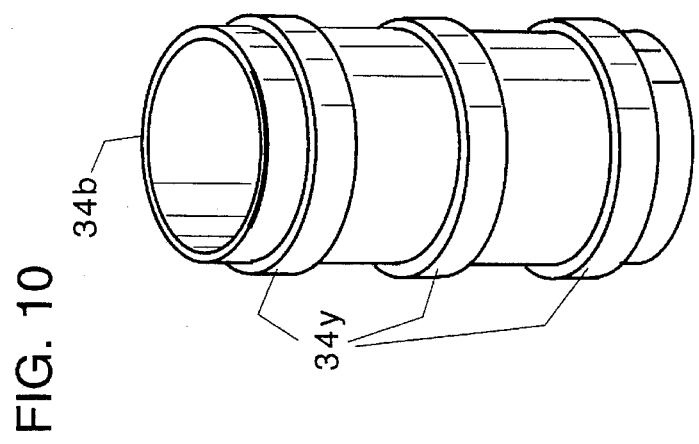
FIG. 10 is a perspective view of a variation of the tube shown in FIG. 9.

In FIGS. 10 and 11, further variations of the elastomeric tube are designated by the reference characters 34b and 34c, respectively. In these variations, the elastomeric tube 34b, 34c, is intended to be substituted for the tube 34 in FIGS. 2 and 3 and to be used without the shims 32a. In particular, in FIG. 10, the provision of three circumferential projecting ribs 34y would ensure a normal bias by the tube 34b directly against the back surface of the shoes 32. Similarly, in FIGS. 11, longitudinally extending ribs 34z which project radially from the outer surface of the tube 34c, will effect a normal bias of the shoes 32 against the friction surface 16.

The shuttle sleeve 44 is formed with a plurality of radial ports 52 which open outwardly to the pressure chamber 36 on the inside of the elastomeric tube 34. The hollow rod 26 is similarly provided with radial ports 54 which are interconnected by a peripheral manifold groove 56 on the exterior of the hollow rod 26.

The shuttle 38 is positioned on the hollow rod 26 between a first stop defined by a plurality of plug-like cushions 57 projecting from the inner face of a collar 58, threaded to the rod at a location spaced from the end of the rod 26, and a second stop defined by an end fitting 60 fixed to the inboard end of the rod 26. Preferably, the second stop is established by an annular rail 61 on the fitting 60. In this way, the second stop may be precisely formed by machining the rail and so that when the surface 46 on the shuttle 38 abuts the rail, the ports 52 and 54 are precisely aligned. Also the ports 54 and the manifold groove 56 are positioned on the hollow rod 26 between spaced O-rings 62 and 64 which make a sliding seal with the inside of the shuttle sleeve 44. In the axial space between the O-rings 62 and 64, passage of pressurized fluid between the inside of the shuttle sleeve 44 and the outside of the rod 26 is confined. Thus, movement of the shuttle 38 between a position in which the shuttle ports 52 are located beyond or outside of the space between the O-rings 62 and 64, that is, the position illustrated in FIG. 2, and a position in which the shuttle ports 52 are located between the O-rings, will close and open, respectively, fluid communications between the interior of the hollow rod 26 and the chamber 36 at the inside of the pressure responsive elastomeric tube 34. Also, and as shown in FIG. 2, the chamber 36 is vented to the exterior of the hollow rod 26, when the shuttle 38 is positioned so that the ports 52 lie outside of the space between the O-rings 62 and 64, by a necked portion 67 of the rod 26 and the space between the cushions 57.

As shown in FIG. 1, an external source of air 66, represented schematically, is connected to the interior of the hollow rod 26. The amount of pressure at the source 66 and to which the interior of the hollow rod 26 is subjected is preferably at atmospheric pressure but may be set to variable higher pressures. A pressure regulator 68 may be included when pressure at the source 66 is above atmospheric pressure. Irrespective of such pressure, the source is in communication with the interior of the hollow rod at all times during operation of the friction damper 10.

Figure 4:
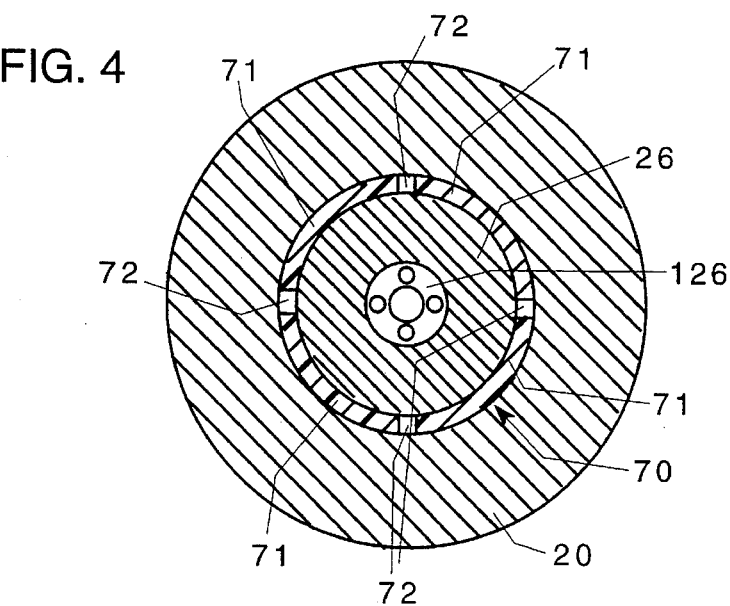
FIG. 4 is an enlarged cross-section on line 4—4 of FIG. 1.
Figure 5:
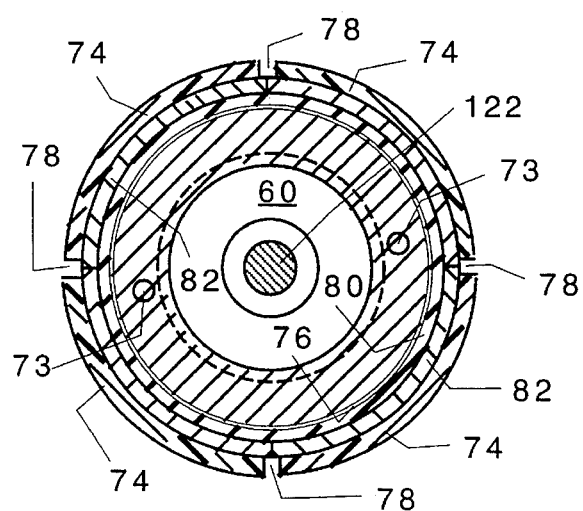
FIG. 5 is a cross-section on line 5—5 of FIG. 2.
Figure 6:
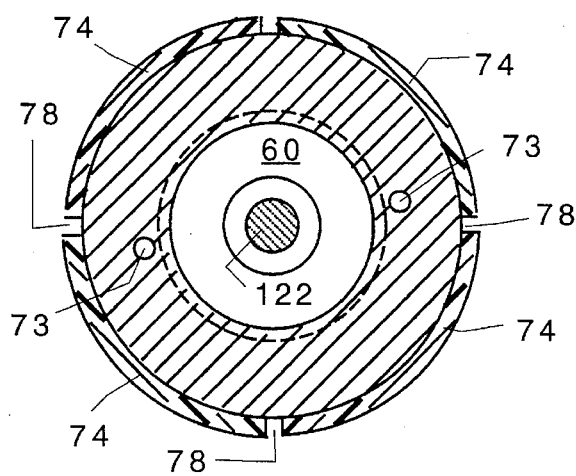
FIG. 6 is a cross-section on line 6—6 of FIG. 2.

In the illustrated embodiment and with particular reference to FIGS. 1 and 4 of the drawings, the hollow rod 26 of the inner body 12 is constrained to alignment with the collar 20 at one end of the outer body 14 by a slide bearing 70 at the inner surface of the collar 20. The bearing 70 is formed by four segments 71 of low friction material to be described in more detail below; however, it is contemplated that one or more such segments may be used in the bearing to provide symmetry of slide bearing support about the circumference of the hollow rod 26. It is to be noted that the segments 71 are spaced by radial gaps 72. The gaps 72 provide venting passageways by which air within the outer body 14 between the inner end of the inner body 12 and the collar 20 may be vented to atmosphere. Similarly, the gaps 35 between the shuttle carried friction shoes 32 provide venting passageways between the friction shoe assembly 30 and the inner friction surface 16 of the outer body 14. Also, and as shown in FIGS. 2, 5 and 6, the end fitting 60 is formed with at least one axial vent port 73 to avoid any substantial compression of air caused by relative movement of the shuttle toward the end fitting.

In the illustrated embodiment, the venting gaps 35 and 72 are provided by the use of multiple, circumferentially spaced shoes. However, a single, axially split, cylindrical shoe could be used. In the case of such a cylindrical friction shoe or guide bearing, spaced axial grooves may be cut or otherwise formed in the sliding surface thereof.

A further guide bearing arrangement is provided on the fitting 60 at the inner end of the hollow rod 26. As may be understood by reference to FIGS. 2, 5 and 6 of the drawings, the outer periphery of the fitting 60 is recessed to receive a plurality of outwardly convex arcuate segments 74. Inwardly of the peripheral recess in which the segments 74 are received, the fitting 60 is provided with an undercut formation 76 in a manner such that the opposite axial ends of the segments 74 bear directly against the body of the fitting 60. As a result, the axial ends of the segments are confined between the fitting 60 and the inner surface 16 of the outer wall to provide bearing support between the inner end of the rod 26 and the outer body 14. As may be seen in FIGS. 5 and 6, four segments 74 are employed in the illustrated embodiment, the segments being spaced by gaps 78 again for the purpose of permitting air to be vented across the fitting 60 in the outer body 14 as the inner body moves axially in the outer body. As indicated above with respect to the bearing 70, the use of four segments provides symmetry of bearing support at the end of the inner body 12 about the circumference of the fitting 60. However, it is contemplated that other symmetrical arrangements, such as one or more such segments, may provide the equivalent bearing support.

A further venting provision is provided at the closed end of the outer body. In the illustrated embodiment and as shown in FIG. 1, a filtered vent plug 79 is mounted in the end wall 22. Thus any tendency for air to compress by jounce movement of the inner body 12 toward the closed end of the outer body will be avoided by venting air through the vent plug 79. Similarly, any reduction of air pressure on rebound movement of the inner body away from the closed end 22 will be minimized by air passing inwardly through the vent plug 79.

In the illustrated embodiment, a pressure actuated friction damping force may be exerted between the inner and outer bodies. Such friction damping force will be applied between the bodies during both jounce and rebound relative movement between the two bodies but predominantly in rebound. The controlled fluid pressure actuated friction force is applied to the arcuate segments 74 which define the bearing support for the inboard end of the hollow rod 26. In particular, the under cut portion 76 of the fitting receives an elastomeric tubular member 80 having properties similar, if not identical, to the properties of the elastomeric tube 34 described above with reference to the friction shoe assembly 30. Outwardly of the elastomeric tube 80, a plurality of arcuately convex shims 82 or elastomeric projections are positioned so as to lie between the outside of the elastomeric tube 80 and inside of the bearing shoe segments 74. Inside the elastomeric tube 80, the under cut formation 76 defines an internal pressure chamber to which compressed air in the hollow rod 26 is supplied through radial ports 84.

In light of the construction of the end fitting 60 as thus shown and described, the axial central region of the bearing segments 74 function as fluid actuated friction shoes forced by fluid pressure against the inside surface 16 of the outer body 14. At the axial ends of the bearing segments 74, the guiding function of the segments is preserved because the direct bearing of the ends of the segments against the end fitting is independent of fluid pressure.

To cushion the end limit of shuttle travel against the rail 61 on the fitting 60, and as shown in FIG. 2, an O-ring 86 is supported adjacent the stop surface of the end fitting 60 in the illustrated embodiment. The O-ring 86 is retained by a relatively shallow circumferential groove in the hollow rod 26 so as to project into the path of the end of the shuttle 38.

In addition, relative travel between the inner body and the outer body between the maximum physical limits of travel is similarly cushioned. In the illustrated embodiment, a relatively large elastomeric O-ring 87 is supported on the hollow rod 26 between the friction shoe assembly 30 and the interior of the end collar 20. A similar O-ring 88 is positioned between the end fitting 60 on the inner body 12 and the end wall 22 on the outer body. Thus, in the event that the bodies move through the maximum permitted travel, the large elastomeric O-rings 87 and 88 will cushion the engagement of components with each other.

The material of all nonmetallic friction members, for example, the segments 71 of the collar bearing 70, the shuttle carried friction shoes 32, and the bearing/friction shoe segments 74 on the end fitting 60, in the illustrated embodiment, is preferably selected to develop interfacial friction by composite/counterface interface with the metal surfaces in which they are in contact. Examples of such materials are polytetrafluoroethylene (PTFE) filled polyphenylene sulfide (PPS), ultra high molecular weight polyethylene, or a composite of PTFE and ultra high molecular weight polyethylene. Such materials exhibit very low coefficients of friction as a result of wear debris from the PTFE, for example, forming a very effective dry lubricant as an interface between the friction shoes or guide segments and the metal surfaces with which they are in contact. Also, unlike conventional Coulombic friction interfaces, the static coefficient of friction of composite/counterface interfaces, in accordance with the present invention, is lower than the dynamic coefficient of friction. As a result, the "stick/slip" behavior of conventional friction materials is avoided.

Although the friction damper of the present invention is useful in a wide range of motion damping applications, it is principally intended for use in land vehicle suspension systems. In an automotive application, for example, the damping device might be used as a suspension strut or as a shock absorber. In this application, a single friction device 10 is mounted between the chassis and each wheel of the vehicle by connecting the threaded end 28 on the hollow rod 26 to the chassis and connection of the outer body 14 to a wheel supporting axle or equivalent. The air source 66, which may be manifested in practice by an air storage tank, for example, is supported on the chassis and connected by conduits to the hollow rods of each friction damper device 10.

During operation, travel of the automotive vehicle will cause the inner and outer bodies 12 and 14 of the respective shock absorber devices 10 to move relative to each other in jounce and rebound directions of movement. The shuttle 38 on the inner body of each device will move between the stop collar 58 and the fitting 60 in correspondence with such inner and outer body movement.

In FIG. 2, the shuttle 38 is illustrated at its upward limit of relative travel, that is, with the abutment surface 46 of the end ring 40 engaged in abutment with the cushions 57 on the stop collar 58. In this position, the ports 52 are isolated by the O-ring 62 from the ports 54 and the manifold groove 56 so that fluid communication between the interior of the hollow sleeve 26 and the pressure chamber 36 inside the elastomeric sleeve 34 is closed. The illustrated position of the shuttle 38 in FIG. 2 is, moreover, the position the shuttle would take during relative jounce movement between the inner and outer bodies 12 and 14. As a result, during jounce movement, the friction shoes 32 are not forced by fluid pressure against the friction surface 16 of the outer body 14. However, at least initial friction damping of inner and outer body movement in jounce may occur by communication between the air under pressure in the hollow rod 26, and the internal pressure chamber defined by the under cut portion 76 in the end fitting 60. In particular, such fluid pressure acting against the interior of the elastomeric tube 80 through the open ports 84 will exert a force to urge the central portions of the bearing segments 74 into frictional engagement with the surface 16 of the outer body 14.

When the inner and outer bodies 12 and 14 move in the opposite direction, or in rebound, the shoes 32 maintain a sufficient drag on the surface 16 so that the shuttle 38 will move until the abutment surfaces 46 on the end ring 42 engage the upper surface of the end fitting 60. The drag adequate to insure such shuttle movement may be adjusted by varying the amount of end bias on the elastomeric tube 34 by the end rings 40 and 42, thus determining the amount of outward force exerted by outward bulging of the tube 34 with no internal pressure. In this position, the ports 52 on the shuttle sleeve 44 will be aligned with the manifold groove 56 at the exterior of the hollow rod ports 54 so that pressure inside the hollow rod 26 will be communicated with the internal pressure chamber 36 defined by the elastomeric tube 34. Thus, in rebound movement of the inner and outer bodies, the friction shoes 32 will be forced by a fluid pressure outwardly against the inner surface 16 of the outer body 14 in a manner to supplement the frictional drag of the end fitting carried bearing segments 74 biased by the same fluid pressure in the described embodiment.

Figure 7:
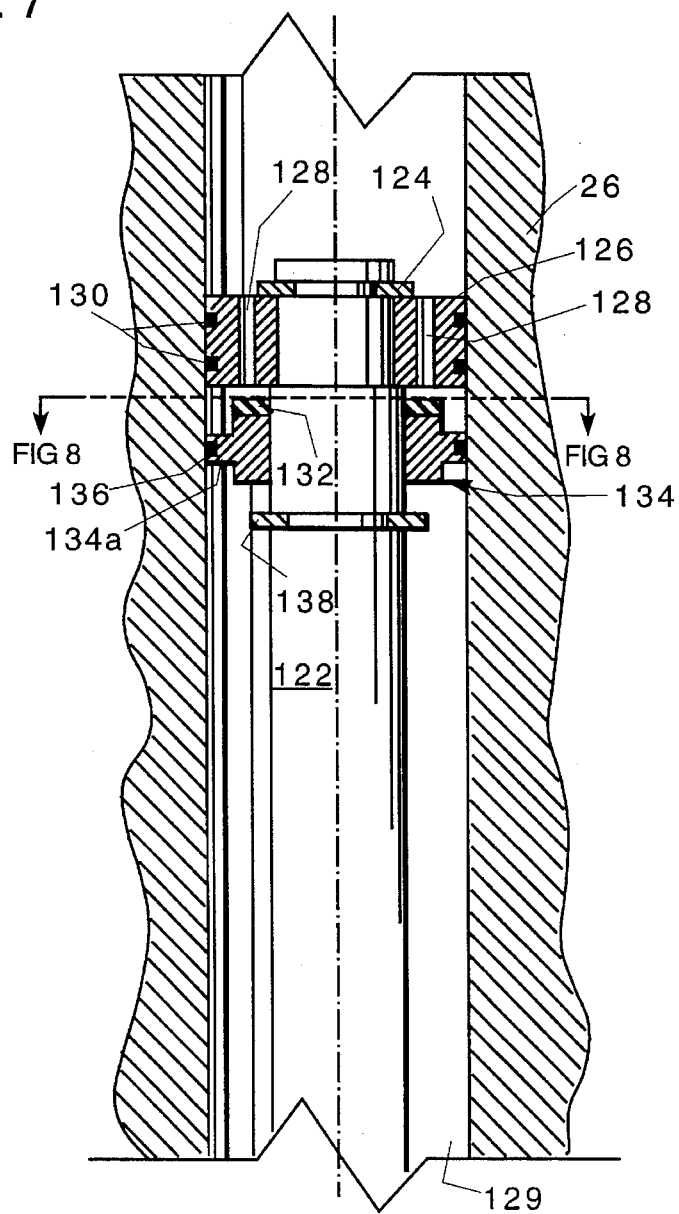
FIG. 7 is an enlarged fragmentary cross-section of the top portion of FIG. 2.

In accordance with the present invention, the normal force of the friction shoes against the friction surface is responsive to the velocity of relative movement between the inner and outer bodies, particularly in rebound. In the illustrated embodiment, as shown in FIGS. 1, 2 and 7, extending through the central axis of hollow rod 26, is a piston rod 122. At one end, the piston rod 122 exits through a slide bushing 120 beyond the end fitting 60 to be fixed in the end wall 22 of the outer body 14. At an opposite end, the piston rod 122 mounts components most clearly shown in FIGS. 7 and 8 to include a spring clip 124 at the top end of the piston rod 122, which restricts in one direction the movement of a generally circular piston head 126. The piston head 126 is mounted on and surrounds a necked down portion of the piston rod 122 and has defined therethrough a plurality of air vents 128. The air vents 128 lie parallel to the piston rod 122.

From the described organization of the hollow rod 26, the piston head 126, and the slide bushing 120, an expansible chamber 129 is established in the hollow rod 26.

Spaced below the piston head 126 is a sliding bushing 134 which has located on its top, near the piston head 126, an elastomeric pad 132. The sliding bushing 134 is also generally circular in shape except for the extension of two side wings 134a which are well shown in FIG. 8. A base spring clip 138 connected to the piston rod 122, acts to limit the motion of the sliding bushing 134 below piston head 126. O-rings 130 and 136 extend around both piston head 126 and sliding bushing 134, respectively so that the two will slide with respect to the inside walls of hollow rod 26. However, the O-rings also seal off the passage of air where they lie flush against the interior cylindrical surface in the hollow rod 26.

Figure 8:
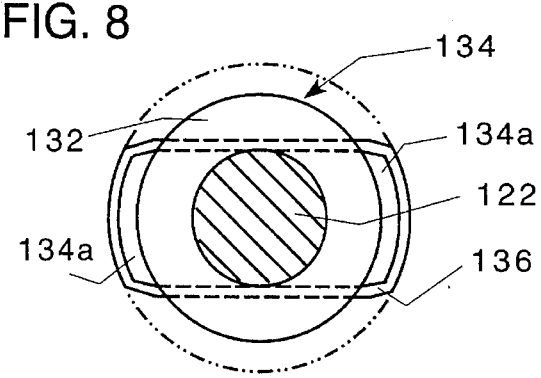
FIG. 8 is a cross-section on line 8—8 of FIG. 7.

FIG. 8 is a top view of the elastomeric pad 132 and the sliding bushing 134. From this view, side wings 134a are readily seen. The fact that the side wings 134a do not encircle the sliding bushing 134 with O-ring 136 therearound, permits the passage of air past the sliding bushing 134.

The elastomeric pad 132 may be designed and constructed so as not to fully close off or cover one or more of the vents 128 defined in the piston head 126. The extent to which these vents are covered will affect the air flow into and out of the chamber 129 in the hollow rod 26. Alternatively, the bushing 134 and the elastomeric pad 132 may be omitted altogether leaving merely the piston head 126 mounted atop the piston rod 122. Such a change will affect the air flow through vents 128 but the velocity responsive operation of the friction damper will be retained in substantial part.

The piston head 126 and the bushing 134 are intended to result in a velocity sensitive system that works in conjunction with the friction damper 10. In this form, the compression zone is located within the body of the damper 10 itself and is self-actuated to increase damping force when the device is involved in extension or rebound strokes. This is accomplished through the extension of piston rod 122 in the expansible chamber 129 defined by the hollow rod 26. The piston rod 122 and at least the piston head 126 with vents 128 act as an internal off-on valve actuated by jounce and rebound telescopic motion. As rebound or extension occurs, the sliding bushing 134 on piston rod 122 is forced by the friction of its stretched O-ring 136 toward piston head 126. This forces the elastomeric pad 132 against the multiple air vents 128 of the piston head 126. In this position and when relative velocity and stroke are considered, the air in the chamber 129 of the hollow rod 26 is immediately compressed. This fluid pressure is proportionally transmitted to the friction shoes 32 by means of elastomeric tube 34. Thus, it is believed that the actuated friction damper 10 can provide the desired elements of suspension damping which has heretofore been almost the exclusive purview of hydraulic dampers.

In rebound, therefore, both the friction shoes 32 on the shuttle 38 and the friction shoes 74 on the end fitting 60 will be biased by pressure in the chamber 129 continuously throughout the stroke length of rebound movement. Moreover, the magnitude of the fluid pressure bias will vary in direct proportion to the velocity of relative rebound movement between the inner and outer bodies 12 and 14. In jounce, the shuttle mounted friction shoes 32 will exert little or no damping effect since the shuttle will initially move to the position shown in FIG. 2 and vent the chamber 36 on the inside of the elastomeric tube 34. During the initial jounce movement, however, the shoes 74 on the end fitting 60 will be exposed to pressure in the chamber 129, developed during the previous rebound stroke, and accordingly, provide damping during that initial jounce movement. As the jounce stroke continues, the pressure in the chamber 129 will decrease and reduce the friction damping effect of the shoes 74 over the remaining stroke length of jounce movement.

From the foregoing, one will readily appreciate that it is preferable that the piston rod 122 be slidable or have a slidable coating at least at the end where the piston head 126 and the sliding bushing 134 are located. This will enable these members to slide together and apart. The sliding bushing 134 and the piston head 126 may be manufactured of metal or of a solid synthetic having a low coefficient of friction. The inside cylindrical surface of the hollow rod 26 is preferably a slidable surface which is present in finished metals or materials made of or coated with a slidable material. One such material which may be used as a coating for both the bore surface of hollow rod 26 and piston rod 122 is a material by the trademark of XYLAN.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fluid actuated friction damper comprising:

telescopic inner and outer bodies having overlapping inboard ends and oppositely extending outboard ends establishing a damper length which shortens in jounce movement between the inner and outer bodies and lengthens in rebound movement between the bodies;

the outer body having an elongated, continuous friction surface between the inboard and outboard ends thereof;

the inner body comprising a hollow rod extending substantially between the inboard and outboard ends thereof and defining an interior cylindrical chamber surface, and friction shoe means mounted on the hollow rod near the inboard end thereof, said friction shoe means being engageable with said continuous friction surface under a normal friction force developed by compressed gas;

piston means positioned within said cylindrical chamber, the piston means being fixed to the outer body and slidable in the cylindrical chamber relative to said inner body; and seal means to define with the interior cylindrical chamber surface and the piston means a variable volume chamber, whereby relative movement of said piston means and said inner body during jounce movement of the inner and outer bodies reduces gas pressure in said variable volume chamber, and movement of said piston means during rebound movement of the bodies increases gas pressure in said variable volume chamber; and means, responsive to gas pressure in said variable volume chamber, for changing the normal force of engagement between said friction shoe means and said continuous friction surface.

2. The fluid actuated friction damper of claim 1 wherein said piston means includes vent passages to reduce gas pressure changes in said variable volume chamber upon relative movement between the piston means and the inner body.

3. The fluid actuated friction damper of claim 2 wherein said vent passages contain gas flow restrictors.

4. The fluid actuated friction damper of claim 2 including means for closing said vent passages during rebound movement of said inner and outer bodies.

5. The fluid actuated friction damper of claim 4 wherein said means for closing said vent passages comprises a bushing supported for movement relative to said piston means and closure means carried by said bushing for closing said vent passages during rebound movement of the inner and outer bodies and for opening said vent passages during relative movement of said bodies.

6. The fluid actuated friction damper of claim 5 wherein said bushing includes friction drag means engageable with said cylindrical chamber surface to move said closure means between vent passage opening and closing positions.

\* \* \* \* \*

UNITED STATES PATENT AND TRADEMARK OFFICE
CERTIFICATE OF CORRECTION

PATENT NO.   : 5,570,761
DATED        : November 5, 1996
INVENTOR(S)  : H. Neil Paton It is certified that error appears in the above-indentified patent and that said Letters Patent is hereby corrected as shown below:

Title Page of Patent, box [76], correct the inventor's address as follows:

309 Chestnut Street
        San Francisco, CA  94133

Signed and Sealed this

Eighth Day of July, 1997

*Attest:*

BRUCE LEHMAN

*Attesting Officer*      *Commissioner of Patents and Trademarks*